P. E. OBER.
Well for Water Main Taps.
No. 9,510. Reissued Dec. 21, 1880.
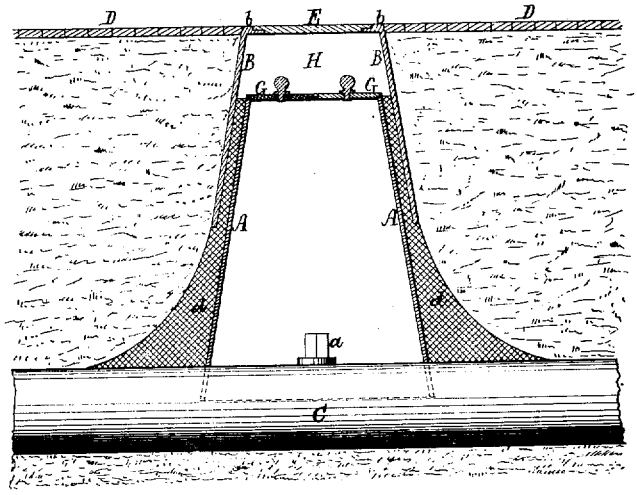
Witnesses
S. N. Piper
Wm. O. Lunt
Inventor
Philip E. Ober
by R. H. Eddy, att'y.

UNITED STATES PATENT OFFICE.

PHILIP E. OBER, OF BEVERLY, MASSACHUSETTS.

WELL FOR WATER-MAIN TAPS.

SPECIFICATION forming part of Reissued Letters Patent No. 9,510, dated December 21, 1880.

Original No. 129,246, dated July 16, 1872. Application for reissue filed August 13, 1880.

*To all whom it may concern:*

Be it known that I, PHILIP E. OBER, of Beverly, of the county of Essex and State of Massachusetts, have invented a new and useful Well or Mouth for Water-Pipe Gates or Faucets; and I do hereby declare the same to be fully described in the following specification and represented in the accompanying drawing, which exhibits a vertical section of my invention applied to a roadway and a water main or pipe and its gate disposed below the surface of such roadway.

A water-pipe-gate well as made prior to my invention has been a tubular pyramidal frustum, open at top and bottom and extended from the water-pipe up to the sidewalk, each having to be made of a depth to correspond with that of the pipe beneath the top of the roadway or sidewalk.

As the distributing pipes and mains of water-works when laid generally vary in their depths below the surface of the earth, they require gate-wells to correspond to such depths whenever such wells are required to be used.

In carrying out my invention I make the gate-well in two or more conical or pyramidal sections or frustums, A B, arranged with their lesser bases upward and with the upper part of the lower frustum disposed within the lower part of the upper, the same being so that while the lower frustum may rest on the water-pipe C and encompass the gate-shank *a*, the upper frustum may be raised or depressed on the lower one to the desirable altitude to bring the cap-ring *b* to the level of the sidewalk or roadway D. After the two frustums may have thus been arranged cement is to be placed in the space between them, and should extend down to the base of the lower frustum and entirely around such frustum, the mass of cement shown at *d* having a tapering outer surface whose diameter is greatest at its base, the whole being to prevent the earth, by the action of frost, from adhering to and lifting the well out of place.

A cover, E, is to be placed on the cap-ring and within the upper frustum, and upon the top of the lower frustum there are to be laid two covers or a cross-partition, G G, so as to form a dead-air space or chamber, H, between the two covers G G and the cover E, the same being to protect the pipe and its valve or gate from being frozen.

I claim—

1. The water-gate well or mouth made in two or more pyramidal or conical sections or frustums, A B, arranged together and with cement *d*, all as explained.

2. The combination and arrangement of the caps or covers G and E with the two frustums A B, arranged and combined with and by means of cement *d*, all as explained and represented.

3. The water-pipe and gate-shank well composed of tubular sections and provided with covers and arranged with a water-pipe and its gate-shank, and having the lower of such sections open at bottom and resting on the pipe, as set forth.

PHILIP E. OBER.

Witnesses:
R. H. EDDY,
WM. W. LUNT.